(12) United States Patent
Beale

(10) Patent No.: US 9,131,368 B2
(45) Date of Patent: Sep. 8, 2015

(54) METHOD AND APPARATUS FOR COMMUNICATING IN AN INCREASED COVERAGE AREA TO A WIRELESS COMMUNICATION UNIT

(71) Applicant: Martin Beale, Bristol (GB)

(72) Inventor: Martin Beale, Bristol (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 55 days.

(21) Appl. No.: 13/667,946

(22) Filed: Nov. 2, 2012

(65) Prior Publication Data

US 2014/0126549 A1 May 8, 2014

(51) Int. Cl.
*H04W 16/02* (2009.01)
*H04W 16/00* (2009.01)
*H04W 16/08* (2009.01)

(52) U.S. Cl.
CPC .............. *H04W 16/02* (2013.01); *H04W 16/00* (2013.01); *H04W 16/08* (2013.01)

(58) Field of Classification Search
CPC ... H04W 16/00; H04W 16/02; H04W 72/042; H04W 16/08
USPC .................................. 370/252, 254, 328–330
See application file for complete search history.

(56) References Cited

U.S. PATENT DOCUMENTS

| | | | |
|---|---|---|---|
| 2009/0310589 A1 | 12/2009 | Nangia | |
| 2010/0317385 A1* | 12/2010 | Kazmi et al. | 455/501 |
| 2011/0077059 A1* | 3/2011 | Kim et al. | 455/574 |
| 2011/0170496 A1* | 7/2011 | Fong et al. | 370/329 |
| 2011/0188427 A1* | 8/2011 | Ishii | 370/311 |
| 2011/0194527 A1* | 8/2011 | Lin et al. | 370/330 |
| 2011/0195741 A1* | 8/2011 | Kim et al. | 455/522 |
| 2011/0216721 A1* | 9/2011 | Min | 370/329 |

(Continued)

FOREIGN PATENT DOCUMENTS

| | | |
|---|---|---|
| EP | 2 265 049 A2 | 12/2010 |
| EP | 2378672 | 10/2011 |

(Continued)

OTHER PUBLICATIONS

The application of power control in WCDMA is specified in 3GPP TS 25.214 section 5. 3GPP TS 25.214 V8.13.0 (Mar. 2012) Release 8, pp. 1-95. ftp://ftp.3gpp.org/Specs/latest/Rel-8/25_series/25214-8d0.zip.

H.Holma, A.Toskala. "WCDMA for UMTS: Radio Access for Third Generation Mobile Communications, Revised Edition". John Wiley & Sons; Revised edition (Mar. 7, 2001) pp. 33-36.

C.Johnson. "Long Term Evolution in Bullets" 1st edition. Published by CreateSpace. pp. 198-205.

(Continued)

*Primary Examiner* — Ahmed Elallam
(74) *Attorney, Agent, or Firm* — Fitch Even Tabin & Flannery LLP

(57) ABSTRACT

A method for increasing coverage in a wireless communication system is described. The method comprises, at the network element: transmitting a first portion of subframes comprising a number of resource blocks to a first wireless communication unit in a first mode of operation, wherein the number of resource blocks are transmitted at a first power level per resource block; and transmitting, a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block.

21 Claims, 8 Drawing Sheets

(56) References Cited

U.S. PATENT DOCUMENTS

| | | | |
|---|---|---|---|
| 2011/0281614 A1* | 11/2011 | Kitahara | 455/522 |
| 2012/0044846 A1* | 2/2012 | Videv et al. | 370/311 |
| 2012/0046064 A1* | 2/2012 | Baldemair et al. | 455/522 |
| 2012/0163437 A1* | 6/2012 | Frederiksen et al. | 375/224 |
| 2012/0176998 A1* | 7/2012 | Muellner et al. | 370/329 |
| 2012/0202540 A1* | 8/2012 | Lee et al. | 455/501 |
| 2012/0263117 A1* | 10/2012 | Love et al. | 370/329 |
| 2012/0281644 A1* | 11/2012 | Hamaguchi et al. | 370/329 |
| 2012/0287883 A1* | 11/2012 | Sabella et al. | 370/329 |
| 2013/0010720 A1* | 1/2013 | Lohr et al. | 370/329 |
| 2013/0010749 A1* | 1/2013 | Chang et al. | 370/330 |
| 2013/0039305 A1* | 2/2013 | Kishiyama et al. | 370/329 |
| 2013/0044621 A1* | 2/2013 | Jung et al. | 370/252 |
| 2013/0072213 A1* | 3/2013 | Agrawal et al. | 455/452.2 |
| 2013/0244709 A1* | 9/2013 | Davydov et al. | 455/501 |
| 2013/0303153 A1* | 11/2013 | Bontu et al. | 455/423 |
| 2013/0322359 A1* | 12/2013 | Hunsaker et al. | 370/329 |

FOREIGN PATENT DOCUMENTS

| | | |
|---|---|---|
| WO | 2009002243 | 12/2008 |
| WO | 2010118382 A1 | 10/2010 |

OTHER PUBLICATIONS

Relay functionality (that uses MBMS subframes) is described in 3GPP TR 36.216: ftp://ftp.3gpp.org/Specs/latest/Rel-10/36_series/36216-a31.zip 3GPP TS 36.216 V10.3.1 (Sep. 2011) Release 10, pp. 1-16.

C.Johnson. "Long Term Evolution in Bullets" 2nd edition. Published by CreateSpace Independent Publishing Platform. pp. 495-500.

European Patent Application No. 13189164.0/1854; Extended European Search Report Dated Apr. 17, 2014.

3GPP "3rd Generation Partnership Project; Technical Specification Group Radio Access Network; Study on provision of low-cost MT UEs based on LTE; (Release 11)," 3GPP Draft; R1-123075_36888-200, 3RD Generation Partnership Project (3GPP), Mobile Competence Centre; 650, Route Des Lucioles; F-06921 Sophia-Antipolis Cedex; France, Jun. 11, 2012, XP050601305, (Retrieved on Jun. 11, 2012).

General Dynamics Broadband UK: "Coverage Extension of MTC UEs," 3GPP Draft; R1-125204, 3RD Generation Partnership Project (3GPP), Mobile Competence Centre; 650, Route Des Lucioles; F-06921 Sophia-Antipolis Cedex; France, vol. RAN WG1, no. New Orleans, Louisiana; 2012112-2012116 Nov. 2, 2012, XP050663062, Retrieved from Internet: URL:http://www.3gpp.org/ftp/tsg_ran/WG1_RL1/TSGR1_71/Docs.

* cited by examiner

FIG. 1 – Prior art

METHOD AND APPARATUS FOR COMMUNICATING IN AN INCREASED COVERAGE AREA TO A WIRELESS COMMUNICATION UNIT

FIELD OF THE INVENTION

Related Application(s)

The field of this invention relates to a method and apparatus for providing increased coverage to a wireless communication unit, such as user equipment (UE), for example in a long term evolution wireless communication system.

BACKGROUND OF THE INVENTION

A recent development of third generation (3G) wireless communications is the long term evolution (LTE) cellular communication standard, sometimes referred to as a $4^{th}$ generation (4G) system. 4G systems will be deployed in existing spectral allocations owned by network operators and new spectral allocations that are yet to be licensed. LTE devices are able to operate on carriers of bandwidth up to 20 MHz. FIG. 1 illustrates a simplified block diagram of a downlink sub-frame of a carrier 100 comprising a legacy control channel region 105 and a plurality of resource blocks (RBs) 110 as stipulated in the LTE standard. In FIG. 1, the RBs span a bandwidth of 20 MHz 115, where each RB comprises twelve sub carriers and each sub carrier has a bandwidth of 15 KHz. RBs comprise physical downlink shared channels (PDSCH).

The requirement to support a bandwidth of up to 20 MHz increases device cost in comparison to lower bandwidth systems, such as the General Packet Radio Service (GPRS). The cost of supporting high bandwidth devices has led to an increasing desire to support low bandwidth (and hence low cost) LTE devices within higher bandwidth carriers. Examples of devices that could beneficially use LTE include so-called machine type communication (MTC) devices, which are typified by semi-autonomous or autonomous wireless communication devices communicating small amounts of data on a relatively infrequent basis. Examples of MTC devices include so-called smart meters, which, for example, may be located in a customer's house and periodically transmit information back to a central MTC server data relating to the customer's consumption of a utility such as gas, water, electricity and so on.

Whilst it can be convenient for a terminal such as an MTC type terminal to take advantage of the wide coverage area provided by a third or fourth generation mobile telecommunication network, there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data to the network) do not require particularly complex processing to be performed. In many scenarios, providing low capability terminals with a conventional high-performance LTE receiver unit capable of receiving and processing data from an LTE downlink frame across the full carrier bandwidth can be overly complex and expensive for a device which only needs to communicate small amounts of data.

Some MTC devices (and in particular smart meters) may be installed in locations where coverage is poor. For example smart meters may be deployed in basements or cellars where there is significant penetration loss through the building. In order to support communications to/from these MTC devices, a larger system gain (also referred to as maximum coupling loss) needs to be supported by the wireless communication system. Some known potential methods of increasing the supported system gain include:

increasing the eNodeB transmit power. This requires the installation of higher power (and more expensive) power amplifiers at the eNodeB. There may be significant opposition to the installation of such equipment by local residents.

use of external antennas at the UE. These external antennas may be installed at street level and connected to the smart meter in the basement. However, use of such external equipment is likely to increase the cost of deployment by increasing installation cost.

installation of extra network nodes, such as relays or femto cells, adding cost and complexity to the wireless system.

significantly increasing the error correction coding (e.g. repetition coding) applied to the signal. There would also be a significant increase in the number of reference symbols applied.

application of beamforming or beam steering techniques; hence concentrating the eNodeB energy at the UE. Such techniques might require the addition of significant extra equipment at the eNodeB.

SUMMARY OF THE INVENTION

The present invention provides communications units, integrated circuits, methods for increasing communication coverage for wireless communications units and tangible computer program products therefor, as described in the accompanying claims. Specific embodiments of the invention are set forth in the dependent claims. These and other aspects of the invention will be apparent from and elucidated with reference to the embodiments described hereinafter.

DETAILED DESCRIPTION

Figure 1:
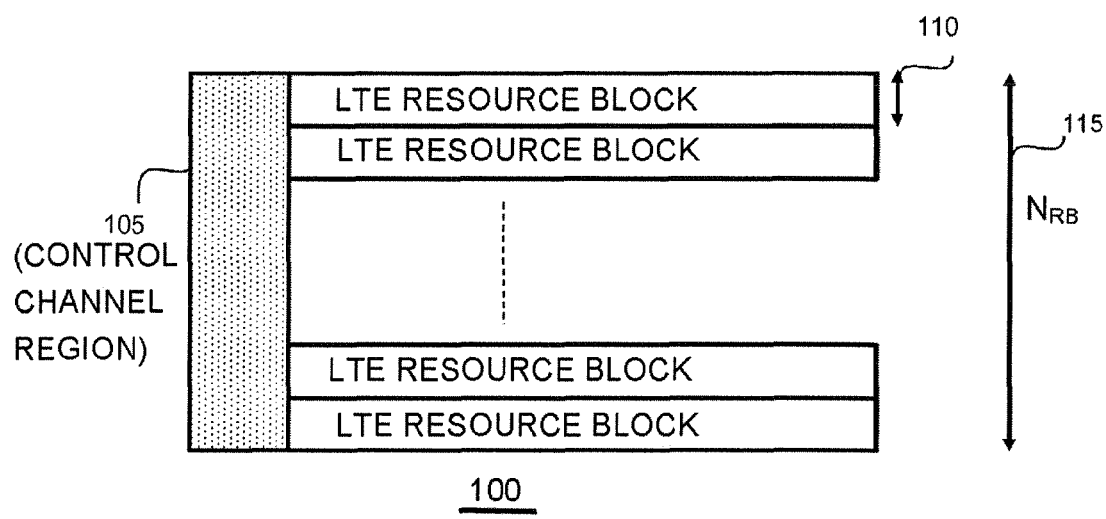
FIG. 1 illustrates a simplified diagram of a sub-frame transmitted by an eNodeB in a long term evolution (LTE) system.

Examples of the invention provide communication units, associated integrated circuits and methods for increasing system gain to provide enhanced coverage for devices. Although examples of the invention are described with reference to improving the coverage area for a low cost Machine-Type communication (MTC) device, relative to normal long term evolution LTE devices, it is envisaged that the inventive concept is also applicable to other wireless communication devices, such as public safety devices.

In the context of the present invention, the term resource block is intended to encompass a set of time and/or frequency and/or code resources. For example, in general in LTE downlink, a 'resource block' would be considered to mean 12 subcarriers and 14 OFDM symbols. A skilled artisan will appreciate that the term resource block would mean other communication resources in other systems.

In particular, a method for increasing coverage in a wireless communication system is described. The method comprises, at the network element: transmitting a first portion of subframes comprising a number of resource blocks to a first wireless communication unit in a first mode of operation, wherein the number of resource blocks are transmitted at a first power level per resource block; and transmitting, a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block.

In this manner, when the eNodeB wishes to communicate to UEs in very poor coverage situations, it is able to narrow the bandwidth of its transmissions and transmit all available power in that narrower bandwidth, for example, the eNodeB transmits a reduced number of subcarriers in the cell. The total power applied in the cell is, however, maintained. By operating in this mode, the power spectral density of the subcarriers that are transmitted is maintained, but the power level per resource block is increased. Hence, the coverage area of communications to/from the UE is increased and the power that the UE receives per subcarrier is now greater. The noise power per subcarrier remains the same. Hence the signal power to noise ratio per subcarrier has increased.

In some examples, the method may further comprise: scheduling a first control channel region in the first portion of subframes and scheduling a second additional separate control channel region in the second portion of subframes, for example where the second portion of subframes may comprise at least one from a group comprising: almost blank subframes, multimedia broadcast single frequency network (MBSFN) subframes. In this manner, almost blank subframes and/or MBSFN subframes may be used to implement a second additional control channel region for communicating with the wireless communication unit In some examples, the method may further comprise scheduling the second separate control channel region in the second portion of subframes across multiple subframes, for example where the second separate control channel region may comprise a control channel signal that allocates a (subsequent) shared downlink resource to the second wireless communication unit In some examples, at least one of the control channel signal and the shared downlink resource may be interleaved over a plurality of second portion of subframes. In some examples, the lower number of resource blocks used in the second portion of subframes may comprise less than a single physical resource block. In this manner, a yet further increase in coverage range may be achieved and a sufficiently large number of bits may be transmitted in a PDCCH or PDSCH compared to the case where transmissions are constrained to a single subframe.

In some examples, scheduling the second portion of subframes in time multiplexed frequency hopped transmissions may be performed such that multiple wireless communication units are supported within available downlink resource in a first communication cell, for example by inserting a time gap between frequency hops, for example wherein a resource block in the frequency hopping comprises a first number of symbols and a second number of subcarriers. In this manner, frequency hopping may be employed in order to address a potential increase in interference into neighbour cells on those subcarriers that are transmitted at higher power, by randomizing the interference across the subcarriers in the neighbour cell. For example, if the neighbour cell transmits using the scheme disclosed herein, then an orthogonal hopping sequence may be employed such that the transmissions in the two cells will not collide.

In some examples, the method may further comprise determining a power requirement of multiple wireless communication units and scheduling a number of resource blocks for the second subframes based at least on a determined power requirement of the second wireless communication unit, for example by:

requesting a path loss measurement from the second wireless communication unit, receiving channel quality information transmitted by the second wireless communication unit, or receiving an indication from the second wireless communication unit of the power that it is using for its transmissions In some examples, scheduling a second separate control channel region in the second portion of a subframe may comprise scheduling at least one of: a Physical Downlink Control Channel (PDCCH), a Physical Hybrid ARQ Indicator Channel (PHICH) and a Physical Control Format Indicator Channel (PCFICH), for example where the channels transmitted by the second additional separate control channel region occupy more than a single subframe.

In some examples, the method may be employed in a long term evolution wireless communication system.

Examples of the invention further provide a tangible computer program product comprising executable code stored therein for increasing coverage in a wireless communication system, wherein the code is operable for, when executed at a network element, performing the aforementioned method.

Examples of the invention further provide a network element for increasing coverage in a wireless communication system. The network element comprises a transceiver operably coupled to a control processor, wherein the control processor is arranged to: transmit, a first portion of subframes comprising a number of resource blocks to a first wireless communication unit in a first mode of operation, wherein the number of resource blocks are transmitted at a first power level per resource block; and transmit, a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block.

Examples of the invention further provide an integrated circuit for a network element for increasing coverage in a wireless communication system. The integrated circuit comprises a control processor, arranged to: transmit a first portion of subframes comprising a number of resource blocks to a first wireless communication unit in a first mode of operation, wherein the number of resource blocks are transmitted at a first power level per resource block; and transmit, a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block.

Examples of the invention further provide a method for communicating in an increased coverage area in a wireless communication system. The method comprises, at a wireless communication unit: receiving in a second extended coverage mode of operation, a signal comprising subcarriers transmitted at a second power level, wherein the signal comprises a second portion of subframes, wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block.

Examples of the invention further provide a tangible computer program product comprising executable code stored therein for communicating in an increased coverage area in a wireless communication system, wherein the code is operable for, when executed at a wireless communication unit, performing the aforementioned method.

Examples of the invention further provide a wireless communication unit comprising: a receiver for receiving in a second extended coverage mode of operation, a signal comprising subcarriers transmitted at a second power level, wherein the signal comprises a second portion of subframes, and a control processor, operably coupled to the receiver and arranged to decode the signal, wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block.

Examples of the invention further provide an integrated circuit for a wireless communication unit comprising: a control processor arranged to decode a signal received in a second extended coverage mode of operation, wherein the signal comprised subcarriers transmitted at a second power level and comprises a second portion of subframes, wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block.

Figure 2:
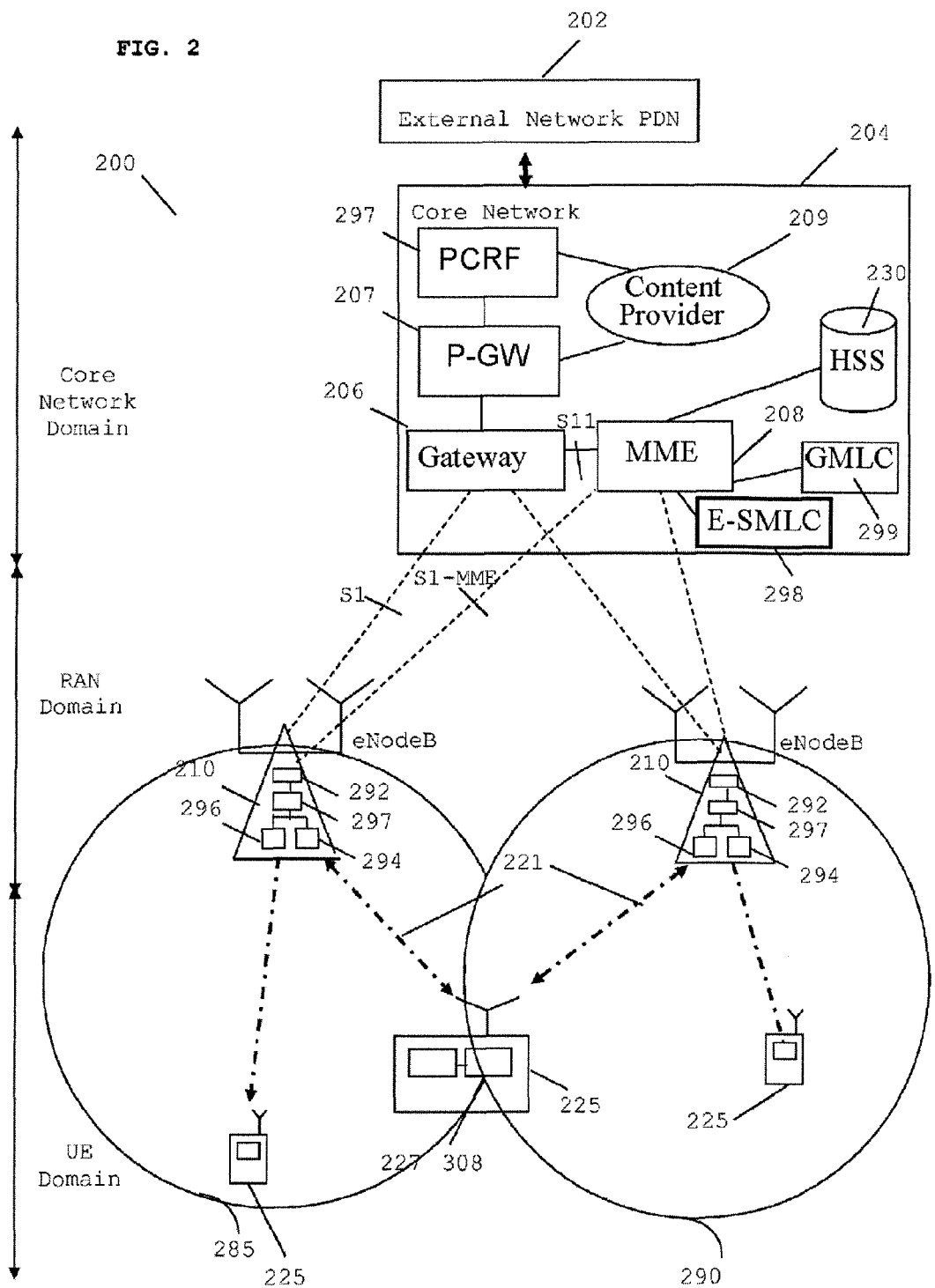
FIG. 2 illustrates a 3GPP™ long term evolution (LTE) cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW may be coupled to a content provider 209. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

In example embodiments, the Gateway 206 may be a Serving Gateway (S-GW). The Gateway 206 is coupled to a mobility management entity MME 208 via an S11 interface. The MME 208 is operable to manage session control of Gateway bearers and is operably coupled to a home subscriber service (HSS) database 230 that is arranged to store subscriber communication unit 225 (user equipment (UE)) related information. As illustrated, the MME 208 also has a direct connection to each eNodeB 210, via an S1-MME interface.

The HSS database 230 may store UE subscription data such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as functions relating to bearer management (which may include the establishment, maintenance and release of bearers), functions relating to connection management (which may include the establishment of the connection and security between the network and the UE 225) and functions relating to interworking with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207 from one or more content providers 209 or via the external PDN 202. The MME 208 may be further coupled to an evolved serving mobile location center (E-SMLC) 298 and a gateway mobile location center (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

If the Gateway 206 comprises an S-GW, the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies such as GPRS™ and UMTS™.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature). Each of the UEs 225 comprise a transceiver unit 227 operably coupled to signal processing logic 308 (with one UE illustrated in such detail for clarity purposes only). The system comprises many other UEs 225 and eNodeBs 210, which for clarity purposes are not shown. As illustrated, each eNodeB 210 comprises one or more wireless transceiver (transmitter and/or receiver) unit(s) 294 that is/are operably coupled to a control processor 296 and memory 292 for storing, inter alia, information relating to UEs and UE capabilities, for example whether the UE is capable of operating as a low bandwidth UE or whether the UE is able to operate in an extended coverage mode. Each eNodeB 210 further comprises a scheduler 297, which may be operably coupled to the one or more wireless transceiver unit(s) 294, the control processor 296 and memory 292. The base station (for example eNodeB 210) is arranged to support.

In example embodiments of the present invention, a control processor of a network element, such as control processor 296 of eNodeB 210, is arranged to transmit a first portion of subframes comprising a number of resource blocks to a first wireless communication unit, such as UE 225, in a first (non-extended coverage) mode of operation, wherein the number of resource blocks are transmitted at a first power level per resource block. The control processor is further arranged to transmit a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block.

In some examples, the control processor 296 may be located on an integrated circuit (not shown).

Clearly, the various components within the eNodeB 210 can be realized in discrete or integrated component form, with an ultimate structure therefore being an application-specific or design selection. Further, although example embodiments of the invention have been described with reference to an evolved NodeB (eNodeB), it should be apparent to a skilled person that example embodiments of the invention could be utilised with any network element, for example a NodeB within a 3GPP™ high speed packet access (HSPA) network, or any other wireless networks.

Figure 3:
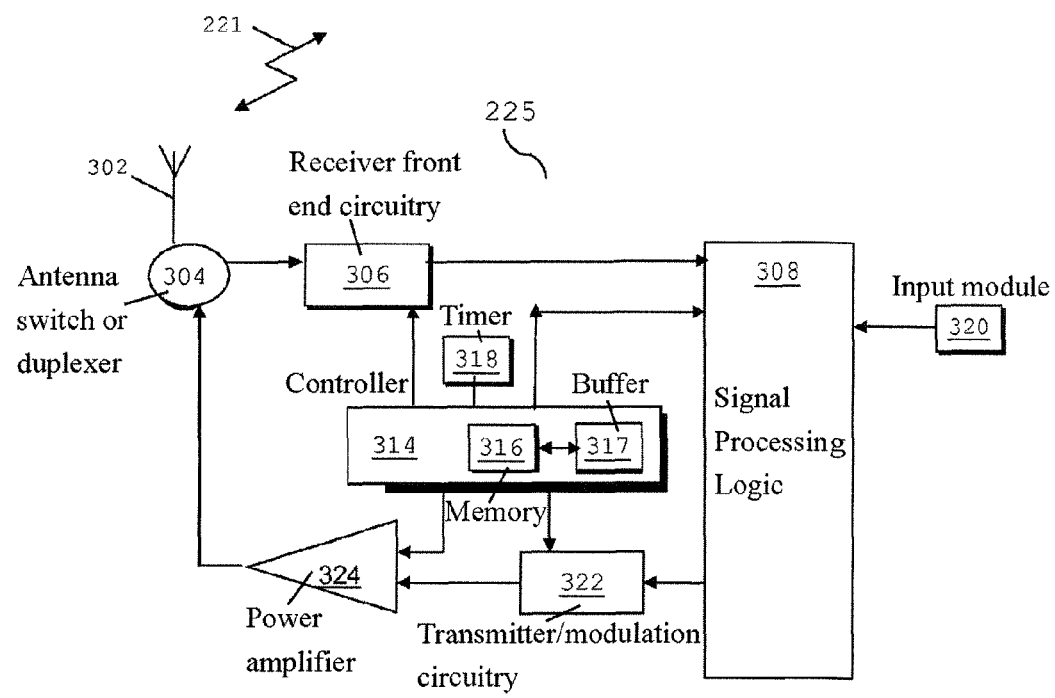
FIG. 3 illustrates an example block diagram of a wireless communication unit, such as a 3GPP™ LTE user equipment adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless subscriber communication unit, such as a UE 225. The wireless communication unit 225 contains an antenna 302 coupled to an antenna switch or duplexer 304 that provides isolation between receive and transmit chains within the wireless communication unit 225. One or more receiver chains, as known in the art, include receiver front-end circuitry 306 (effectively providing reception, filtering and intermediate or base-band frequency conversion). The receiver front-end circuitry 306 is coupled to a control processor 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 225. The controller 314 is also coupled to the receiver front-end circuitry 306 and the control processor 308. In some examples, the controller 314 is also coupled to a buffer module 317 and a memory device 316 that selectively stores operating regimes, such as decoding/encoding functions, synchronization patterns, code sequences, and the like. A timer 318 is operably coupled to the controller 314 to control the timing of operations (transmission or reception of time-dependent signals) within the wireless communication unit 225.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

In some examples, the control processor 308 may be located on an integrated circuit (not shown). The control processor 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 225 can be realized in discrete or integrated component form, with an ultimate structure therefore being an application-specific or design selection.

In examples of the invention, the wireless communication unit 225 comprises a receiver for receiving in a second extended coverage mode of operation, a signal comprising subcarriers transmitted at a second power level, wherein the signal comprises a second portion of subframes. The control processor 308 is operably coupled to the receiver and arranged to decode the signal, wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block.

Figure 4:
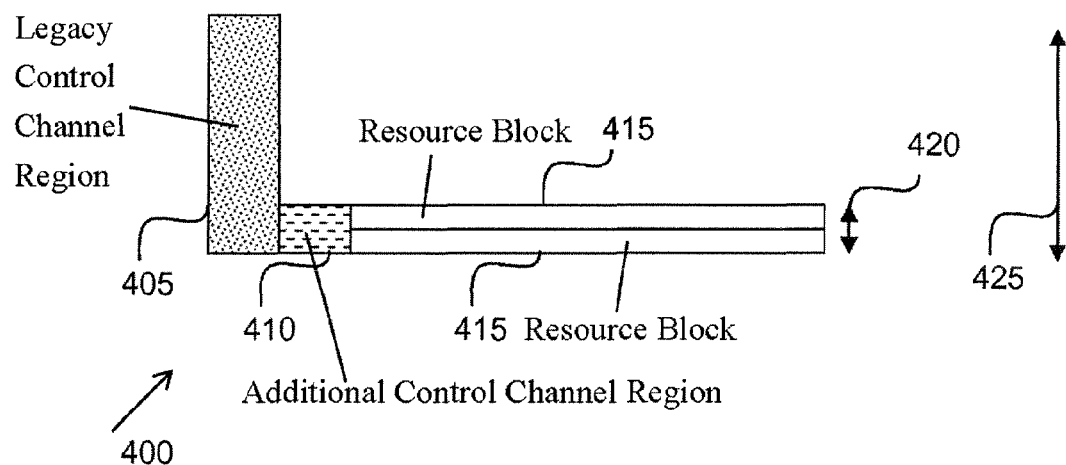
FIG. 4 illustrates a simplified example schematic diagram of a modified signal sent from an eNodeB.

Referring now to FIG. 4 a schematic diagram illustrating an example of a modified LTE signal 400 as transmitted by the eNodeB, for example eNodeB 210 of FIG. 2 (and received at the wireless communication unit, such as UE 225 of FIG. 2) is shown, comprising legacy control channel region 405 and an additional control channel region 410 for coverage limited UEs, together with at least one resource block 415. In FIG. 4, the eNodeB transmits only $N_{coverage}$ resource blocks 420 in the carrier 425 (in comparison to the legacy case where the eNodeB would transmit using the full $N_{RB}$ resource blocks). For example, the transmissions to the coverage limited UE (control and data) may cover $N_{coverage}*12*15$ kHz (where one resource block 415 covers 12 subcarriers and each subcarrier has a bandwidth of 15 kHz). The number of resource blocks 415 transmitted by the eNodeB would typically be an integer, in this example. However, in other examples, a non-integer value may be used, for example if $N_{coverage}=0.5$, the eNodeB will only transmit half a resource block, i.e. 6 subcarriers, in the bandwidth of the carrier 425. In this manner, the eNodeB is operable to vary the power spectral density of the transmitted $N_{coverage}$ RBs 420, without increasing the total power applied to the carrier 425. In this example embodiment, the eNodeB is operable to dynamically determine how many resource blocks 420 ($N_{coverage}$) to transmit. In this example, the control processor of the eNodeB may be arranged to determine the power requirements of different UEs in the system, and assign those UEs to subframes that are transmitting at the appropriate transmit power per subcarrier and with the appropriate number of subcarriers. In this example, the eNodeB may determine the number of resource blocks 420 to transmit ($N_{coverage}$) by requesting a path loss measurement from a UE. In some examples, this may be achieved via radio resource control signalling at connection setup.

In examples of the invention, the legacy control channel region 405 may be arranged to carry PCFICH, PHICH and PDCCH. The separate control channel region 410 may be arranged to carry separate PCFICH, PHICH and PDCCH at a higher transmit power per subcarrier to coverage limited UEs.

In another example, the control processor of the eNodeB may be arranged to determine $N_{coverage}$ 420 by receiving channel quality feedback indication(s) (CQI) from a desired UE. In this example, CQI feedback indication(s) may be based on transmissions from the eNodeB in a restricted number of RBs 420. This is because it is possible, due to the increased power spectral density of $N_{coverage}$ RBs 420 transmitted in this example embodiment, that a desired UE (if outside normal coverage area) will not be able to receive transmissions at a legacy power per subcarrier from the eNodeB, and thus be unable to perform channel estimation, for the purposes of CQI determination, based on RBs transmitted at legacy power per subcarrier. In another example embodiment, CQI feedback may be based on a non-restricted number of RBs.

In another example embodiment, the scheduler 297 in eNodeB 210 may be operable to schedule UEs in subframes according to their coverage requirements. For example, UEs 225 that are determined to have relatively poor channel conditions may be scheduled in subframes using a single RB 415 at a high power level per subcarrier. Similarly, UEs 225 determined to have relatively good channel conditions may be scheduled using two RBs at a medium power level per subcarrier. In this manner, UEs 225 that are determined to have a certain channel condition may be dynamically scheduled to use anything from 0.5 to 100 RBs for a 20 MHz system, for example.

In this example embodiment, it is not necessary for the control channel region 410 for coverage limited UEs to take up the same amount of resource space (e.g. to occupy the same number of subcarriers) as the legacy control channel region 405. However, in this example embodiment, in order to achieve coverage comparable with that available from the data channel region resource blocks 415, the control channel region 410 for coverage limited UEs is arranged to take up the same amount of resource space as the resource blocks of the data region 415. In another example, the control channel region 410 for coverage limited UEs may be channel coded to code the control channel region more strongly than the RBs transmitted in region 415. In this example, channel coding may comprise turbo coding. Further, in this example RBs 420 may comprise a PDSCH region (not shown).

In this example embodiment, as discussed above, the control processor of the eNodeB 210 may be operable to vary the power spectral density of transmitted RBs, without necessarily increasing the total power applied to the carrier 425.

If the total power transmitted by the eNodeB in the prior art is $P_{tot}$, then the power per resource block 415 transmitted in the prior art is $P_{tot}/N_{RB}$.

If the same total power is applied by the eNodeB to the transmission in this invention, then the power per resource block 415 transmitted in the invention is $P_{tot}/N_{coverage}$.

The gain in the power transmitted per resource block 415 in the invention is thus $N_{RB}/N_{coverage}$. For a 20 MHz host system, the power per resource block 415 may be increased by up to 100/1=>20 dB (noting that a 20 MHz system occupies roughly 100 resource blocks and the coverage-enhanced system may transmit a single resource block 415). In this example, the eNodeB 210 signals the number of resource blocks 415 active in the system in a master information block (MIB). In one example, the control processor of the eNodeB 210 may be arranged to only signal the number of resource blocks 415, and not the bandwidth being used. Therefore, the eNodeB may signal via the MIB that the carrier 425 comprises a 100 resource block carrier and that in subframes used for coverage limited UEs, one resource block per subcarrier could be utilised. It is noted that an LTE system can transmit 100 resource blocks in less than a 20 MHz carrier, for example a 19.5 MHz carrier could be used.

In some examples, it may be possible to utilise a fraction of a resource block 415, say a half of a resource block. This example has an advantage that the power per resource block may be further increased. As discussed previously, if $N_{coverage}$ comprises a single RB 415, the transmitted power in this RB 415 may be increased by upto 20 dB when compared to a prior art system. Utilising a fractional value of a RB 415 allows the transmitted power to be further increased. In this example, it is envisaged that a range from 1RB to 0.5RB may be utilised successfully in order to increase the power per RB

415. In this example, utilising half an RB would further increase the power per resource block to roughly 23 dB, when compared to a prior art 20 MHz system.

In another example embodiment, less than half a RB 415 may be utilised by the eNodeB. In this case, it may be necessary to utilise a different reference signal structure as there would need to be an appropriate number of reference signals in the fractional resource block.

Separate control channel regionAs discussed above, examples of the invention may incorporate a separate control channel region 410 for the coverage limited UEs. This is beneficial since the legacy control region 405 is transmitted across the entire system bandwidth and, hence, the power per subcarrier of the legacy control region 405 cannot be increased. In contrast the separate control channel region 410 for the coverage limited UEs may be transmitted in a lower number of resource blocks 415 (and the power of the resource blocks for the coverage-limited UEs can be increased).

PDCCH and PDSCH Spanning Multiple Subframes

It may appear that the restricted number of resource blocks available in the control channel region 410 for the coverage limited UEs may be seen as limiting the number of UEs that can be scheduled, however this is not a serious concern. The aspect of system operation that is important is the ratio of the amount of physical resource available in the control channel region to the amount of resource available in the PDSCH region. In a legacy LTE system, there are three symbols out of a possible fourteen symbols that may be used for the legacy control region 405. In this example embodiment, one of the possible three symbols is required for legacy devices in order to maintain compatibility with Release-10 systems, as legacy UEs expect at least one symbol's worth of control channel 405 in each subframe. However, the remaining two symbols that are normally utilised by the legacy control channel 405 may be utilised by the control channel for coverage limited UEs 410. In some examples, the control channel 410 for coverage limited UEs may require additional symbols. In this case, the eNodeB 210 is operable to utilise some of the PDSCH region of the RBs 415 in order to increase the size of the control channel 410 for coverage limited UEs.

Therefore, in some example embodiments, the eNodeB 210 is operable to dynamically determine size of the control channel region 410 for coverage limited UEs, for example by using some symbols originally designated for the legacy control channel 405 and some symbols originally designated for PDSCH. In one example, the control processor of the eNodeB 210 may be arranged to determine a size of the control channel 410 for coverage limited UEs based on the number of coverage-limited UEs to be simultaneously scheduled.

One potential issue with the smaller amount of resource available in the separate control channel region 410, shown in FIG. 4, is that a single allocation message (e.g. PDCCH) may not fit within the single resource block that has been reserved for the control region. This issue may be resolved by allowing PDCCH messages to occupy more than a single subframe. In some example embodiments, both PDCCH and PDSCH channels may occupy more than a single subframe. Increasing a time duration of the PDCCH (and potentially the PDSCH) may increase the latency of the system, however this may not be a concern for some delay tolerant MTC applications such as smart metering, for example.

Figure 5:
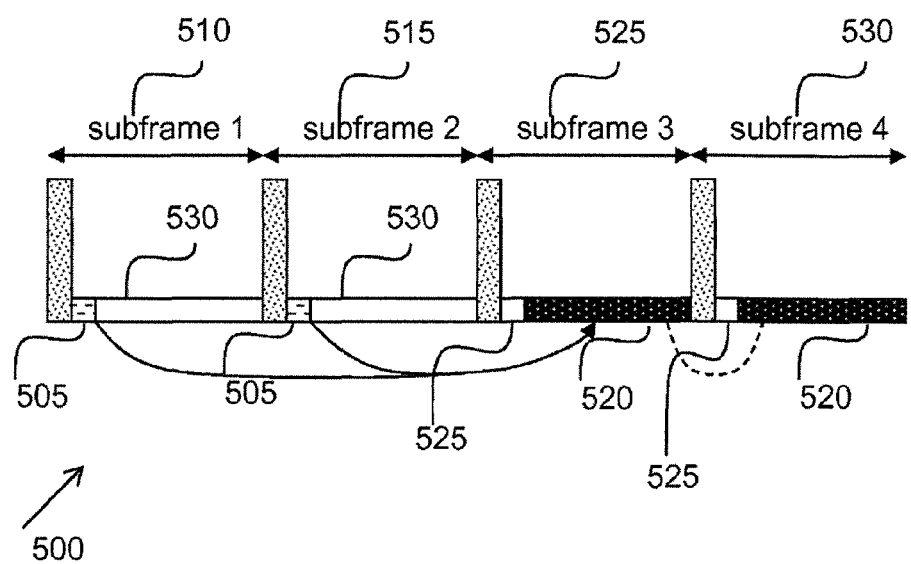
FIG. 5 illustrates a simplified example schematic diagram of a packet data control channel (PDCCH) that occupies subframes 1 and 2 allocating a PDSCH occupying subframes 3 and 4.

FIG. 5 illustrates a simplified example schematic diagram 500 of a PDCCH 505 that occupies subframe 1 510 and subframe 2 515 allocating a PDSCH 520 occupying subframe 3 525 and subframe 4 530. The PDCCH 505 in this example would typically be interleaved across subframe 1 510 and subframe 2 515. Similarly, the PDSCH 520 would typically be interleaved across subframe 3 525 and subframe 4 530.

There are several consequences of increasing the duration of the PDCCH 505 and PDSCH 520 messages. For example each of the interleaved PDCCH 505 and PDSCH 520 messages occupy multiple subframes, thereby increasing latency in the system as a UE would have to wait for the entire PDCCH message interleaved over two subframes and the entire PDSCH message interleaved over two subframes in order to correctly decode the message. In another example, PDCCH 505 and PDSCH 520 messages may be interleaved over any number of subframes. In another example, any spare PDCCH 505 that is not utilised 525 may be used by a subsequent PDCCH message. Furthermore, any spare PDSCH 520 that is not utilised 530 may be used by a subsequent PDSCH message. The PDCCH 505 and PDSCH 520 are shown occupying separate sets of subframes. Extending the PDCCH and PDSCH across multiple subframes can also be applied when PDCCH 505 and PDSCH 520 occupy the same subframes (for example PDCCH occupies subframes 510 and 515; and PDSCH occupies subframes 510 and 515). In order to decode such an arrangement, the UE would have to buffer physical bits from all subframes occupied by the PDCCH and PDSCH (e.g. subframes 510 and 515) before decoding those buffered physical bits.

In this example embodiment, the eNodeB includes a scheduler 297 located within the eNodeB 210. In another example embodiment, the scheduler may be located elsewhere within the network architecture. In this example, the scheduler 297 is operable to make a scheduling decision on the PDSCH 520 earlier than in a legacy LTE case, for example due to potential interleaving of PDCCH 505. In this manner, the scheduler 297 is arranged to determine how much PDSCH 520 resource is to be scheduled before the PDCCH 505 is transmitted. If interleaving is utilised, the PDCCH 505 may take longer to transmit, and hence any scheduling decision will need to be determined earlier than in a legacy LTE case.

Figure 6:
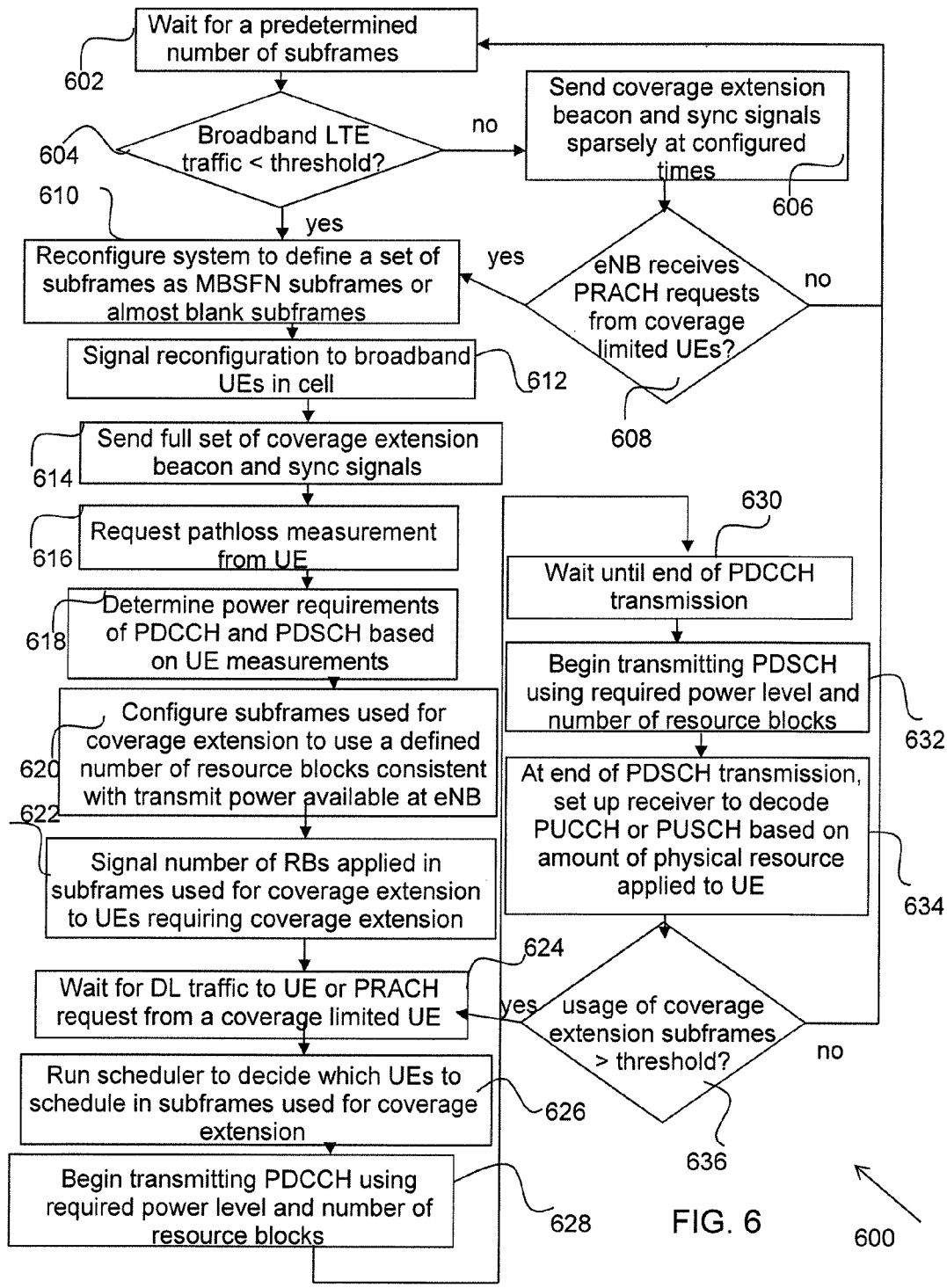
FIG. 6 illustrates a simplified example flow diagram of eNodeB operation utilising aspects of the present invention.

FIG. 6 illustrates a simplified example flow diagram 600 of an eNodeB utilising aspects of the invention. Initially, at 602, the eNodeB (such as eNodeB 210 of FIG. 2) waits for a predetermined number of subframes before determining at 604 whether the amount of some broadband LTE traffic may be less than a threshold value. If it is determined at 604 that the amount of some broadband LTE traffic is greater than a threshold value, the eNodeB may send coverage extension beacon and synchronisation signals sparsely at configured times in 606. By sending these signals sparsely, the eNodeB allows coverage limited UEs to synchronise with the loaded cell, allowing the UEs to indicate to the eNodeB that they have data to send (e.g. via PRACH), but the sparse nature of these signals does not use a significant amount of resource in the loaded cell. At 608, the eNodeB determines whether it has received physical random access channel (PRACH) requests from coverage limited UEs. If it has received such requests, the eNodeB operation proceeds to 610, otherwise the eNodeB operation returns to 602.

If, at 604, the eNodeB determines that broadband LTE traffic is less than a threshold value, the eNodeB reconfigures its system to define a set of subframes as multimedia broadcast single frequency network (MBSFN) subframes or almost blank subframes (ABS) at 610. This is done since when there is little broadband traffic in the cell, the resources may as well be applied to serving MTC UEs instead. At 612 the eNodeB signals a reconfiguration message to broadband UEs in the cell. The reconfiguration includes an indication of the subframes that are being declared as MBSFN subframes. At 614 the eNodeB transmits a full set of coverage extension beacon and synchronisation signals and, at 616, may request a path loss measurement form a desired UE. At 618, the eNodeB determines power requirements of, say, PDCCH and PDSCH signals based on the UE path loss measurement from 616.

At 620, the eNodeB configures subframes used for coverage extension to use a defined number of resource blocks consistent with the transmit power available at the eNodeB. At 622, the eNodeB signals the number of RBs applied to subframes used for coverage extension to UEs requiring coverage extension. The eNodeB then, at 624, waits for downlink traffic to a UE or a PRACH request from a coverage limited UE (the UE may send PRACH to the eNodeB when it has uplink data to transmit, but has not already been scheduled with uplink resource). The eNodeB then runs a scheduler, at 626, to determine those UEs to schedule in subframes for a coverage extension mode of operation. At 628, the eNodeB begins to transmit PDCCH using the required power level and the number of resource blocks determined previously, and waits until the end of the PDCCH transmission at 630. At 632, the eNodeB begins to transmit PDSCH signals using the required power level and number of resource blocks determined previously. At 634, after the PDSCH transmission, the eNodeB sets up its receiver to decode PUCCH or PUSCH based on the amount of physical resource applied to the UEs for these uplink channels. At 636, the eNodeB determines whether the usage of coverage extension subframes is greater than a threshold value. If the eNodeB determines that the usage of coverage extension subframes is greater than the threshold value, the eNodeB returns to 624, otherwise the eNodeB returns to 602. In returning to 602, the cell may be reconfigured to not apply MBSFN subframes for coverage extension purposes (this aspect is not shown in FIG. 6).

In one example embodiment, a consequence of increasing the duration of PDCCH 505 and PDSCH 520 is that the hybrid automatic repeat request (HARQ) cycle may need to be extended. In this example, the HARQ cycle is the time between a scheduling decision being made and an acknowledgement (ACK) or negative acknowledgement (NACK) finally being returned from the UE. Referring back to FIG. 5, in this example embodiment, the HARQ cycle, may have to be extended by three subframes, In a legacy LTE system, PDSCH processing can begin immediately after the subframe that contains the combined PDCCH and PDSCH. However, in this example embodiment, PDSCH 520 processing may only commence after the end of subframe 4 530.

In another example embodiment, it may be possible to utilise fewer HARQ processes, since the ratio of the reception time (e.g. the time to perform receiver signal processing functions) to transmission time (for example, 4 subframes for FIG. 5) may be less when implementing the concepts herein described. Hence, example embodiments may provide the opportunity to operate with fewer HARQ processes when considering low complexity MTC UEs.

Signalling between eNodeB and UE: As part of legacy LTE operation, a UE may be required to perform uplink power control and channel estimation. Generally, a UE is able to estimate the path loss between an eNodeB and the UE in order to control the power of uplink channels. This measurement is usually performed by comparing reference signal received power (RSRP), also known as received power per reference signal, to transmitted power per reference signal. This is signalled to the UE on system information block 2 (SIB2). Furthermore, the UE is operable to perform channel estimation using reference signals that are contained within the resource blocks that are allocated to the UE. The UE may also be able to use reference signals outside those reference blocks, for example some 'outside' reference signals may be used to interpolate the channel with reference signals that are contained within the resource blocks, thereby potentially avoiding edge-effects in the estimation of the channel by the UE.

In both of the abovementioned cases, the UE may be required to know the physical resources that are active in the entire system, in addition to the physical resources that are allocated to itself. Once the UE knows the physical resources that are active in the entire system, it is able to determine those reference signals that are active and can use those reference signals to determine an overall RSRP. It may also use those reference signals for interpolation purposes when performing channel estimation.

In this example embodiment, the UE is operable to utilise any active reference signal. Determining which reference signals are active may prevent the UE from attempting to interpolate to reference signals that are not present in the system.

In one example embodiment, the control processor and the transceiver of the eNodeB may be arranged to signal how much physical resource is active in each subframe to the UE. In this manner, the UE is able to know how much physical resource is active in the entire system, as well as the physical resources allocated to it, and can then determine an overall RSRP.

In one example embodiment, the control processor and the transceiver of the eNodeB may be arranged to transmit a robust signalling sequence within every subframe to a UE. Such a robust signalling sequence may be arranged to allow the UE to readily identify the amount of resource that the eNodeB is transmitting in total. In this example embodiment, the robust signalling sequence may, for example, be a correlation sequence. In another example embodiment, the robust signalling sequence may be a cyclic shift of a known bit sequence.

In one example embodiment, the control processor and the transceiver of the eNodeB may be arranged to signal the total amount of physical resource applied in a cell using a single RB. The robust signalling sequence may also be transmitted in the minimum amount of physical resource that the eNodeB can use, which in one example may be a single RB. In this example or another example embodiment, the single RB may be operable to contain information that indicates that the eNodeB is also transmitting further resource blocks. This use of a single RB provides an advantage in that all desired UEs in the system will be able to receive and decode this information, since it is being transmitted at the highest power spectral density In another example embodiment, the robust signalling sequence may be spread over the resource blocks that the eNodeB utilises in any one subframe. In this example embodiment, the signalling sequence used to indicate that the eNodeB is transmitting 'N' resource blocks may be arranged to be orthogonal to the signalling sequence it uses to indicate that it is transmitting 'M' resource blocks.

In another example embodiment, the control processor and the transceiver of the eNodeB may be arranged to signal the total amount of physical resource applied in a cell using a dynamically determined number of RBs. In this manner, the eNodeB is operable to dynamically select those UEs to signal within the system.

In one example embodiment, the control processor and the transceiver of the eNodeB may be arranged to signal subframes using system information block signalling.

In a further example embodiment, the control processor and the transceiver of the eNodeB may be arranged to signal how much physical resource is active in each subframe to the UE, for example using a defined sequence of subframes (wherein the total amount of physical resource used in certain subframes within a sequence is defined by the eNodeB). For example, the defined sequence of subframes may be configured dependent upon the coverage conditions of the set of receiving UEs: the eNodeB may configure the amount of available physical resource available in different subframes in proportion to the number of UEs with certain path losses.

In this example embodiment, the control processor and the transceiver of the eNodeB may be arranged to, as part of some broadcast signalling, signal to the UE those subframes in which it will transmit using only a single RB, those in which it will transmit using two RBs, etc.

For example, UEs situated in good coverage locations may be scheduled with subframes that use, say, two RBs at a medium power level, for example. This allows the UEs that are not at the extremity of the communication coverage capability of the eNodeB to utilise more resource.

For example, UEs situated in a poor coverage location may be scheduled with subframes that use, say, a single RB at a high power level, for example. Alternatively, in yet further example embodiments, UEs in extremely poor coverage conditions, as determined by the eNodeB, may be signalled using fractional values of RBs. In some examples, it is envisaged that the eNodeB's use of RBs may extend to use of both integer value(s) and fractional value(s) combined, e.g. 1.5 RBs being used.

In one example, the defined sequence of subframes may comprise almost blank subframes and/or MBSFN subframes.

Alternatively, in another example embodiment, the UE may employ blind decoding. Here, a UE attempts to decode an eNodeB transmission based on an assumption that the eNodeB is transmitting a single RB. The UE may be operable to determine a signal-to-interference plus noise ratio (SINR) based on this first assumption. Similarly, the UE may be further operable to decode on an assumption that the eNodeB is transmitting two RBs. The UE is operable to determine an SINR based on this second assumption. The UE may then select the assumption with the best measured SINR and complete the decoding process based on that SINR.

In another example embodiment, the UE may only determine the SINR for assumptions based on its knowledge of channel conditions. For example, in poor channel conditions, the UE may not determine an SINR for a large number of RBs, as the UE may assume that, due to poor channel conditions, only a small number of RBs, e.g. a single RB, would be used.

Figure 7:
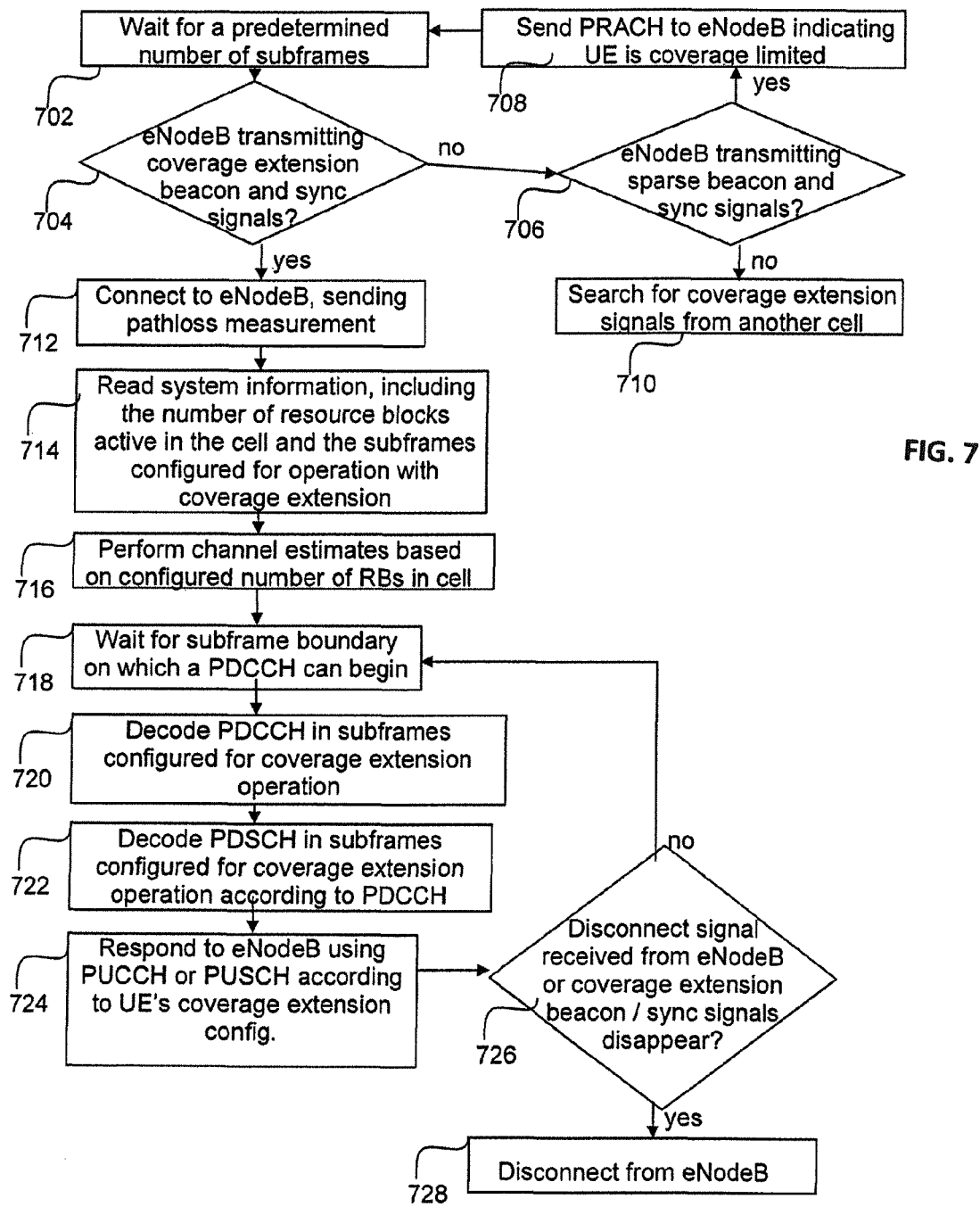
FIG. 7 illustrates a simplified example flow diagram of UE operation utilising aspects of the present invention.

FIG. 7 illustrates a simplified example flowchart 700 of a wireless communication unit, such as a UE, utilising aspects of the present invention. In this example, the UE is a coverage limited UE wishing to communicate with an eNodeB.

Initially, at 702, the UE waits for a predetermined number of subframes, before determining, at 704, whether an eNodeB is transmitting a coverage extension beacon and synchronization signals. If the UE determines that the eNodeB is not transmitting coverage extension beacon and synchronization signals, it determines, at 706, whether the eNodeB is transmitting sparse beacon and synchronization signals instead. If the UE determines at 706 that the eNodeB is transmitting sparse beacon and synchronization signals, it sends a physical random access channel (PRACH) signal or a PRACH preamble signal to the eNodeB indicating that it is coverage limited at 708, before returning to 702.

Otherwise, if the UE determines at 706 that the eNodeB is not transmitting sparse beacon and synchronization signals, the UE 700 searches for a coverage extension signals from another cell at step 710.

If the UE determines that the eNodeB is transmitting coverage extension beacon and synchronization signals at 704, the UE connects to this eNodeB and sends a path loss measurement at 712. The UE then reads system information provided by the eNodeB, at 714, which may include information on the number of RBs active in the cell and the subframes that have been configured for operation with coverage extension. The UE is then operable to perform channel estimation based on the configured number of RBs in the cell, at 716, before waiting for a subframe boundary on which a PDCCH can begin, at 718. In this example, the waiting for a subframe boundary relates to the fact that some PDCCH may need to be transmitted across a plurality of subframes (as described with reference to FIG. 5). In 718, if PDCCHs are transmitted in a single subframe, a PDCCH can begin on every subframe boundary that is configured for coverage extension operation: noting that only certain subframes, e.g. MBSFN subframes, may be configured for operation in a coverage extension mode.

The UE is then operable to decode the PDCCH in subframes that are configured for coverage extension operation, at 720, before decoding PDSCH in subframes configured for coverage extension operation according to PDCCH in 722. The UE is then operable, in 724, to respond to the eNodeB using PUCCH or PUSCH according to the UE's configuration and the degree to which it is coverage limited. In 726, the UE determines whether a disconnect signal has been received from the eNodeB, or whether coverage extension beacon/synchronization signals have disappeared. If the UE determines that it has not received a disconnect signal from the eNodeB in 726, or that coverage extension beacon/synchronization signals have not disappeared it returns to 718; otherwise it disconnects from the eNodeB at 728.

Figure 8:
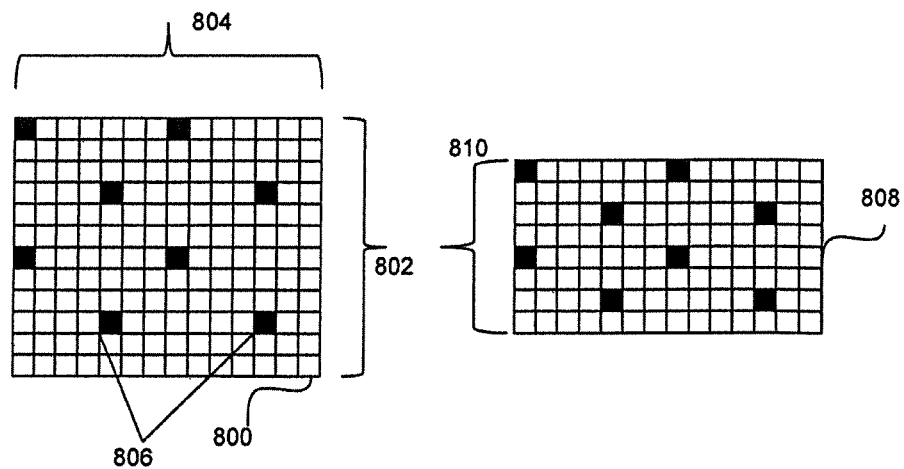
FIG. 8 illustrates a simplified example block diagram of reference signal positioning within a legacy resource block and a fractional resource block, according to aspects of the invention.

As discussed above, it may be possible for an eNodeB to transmit less than a single RB. FIG. 8 illustrates a legacy single RB 800, comprising 12 subcarriers 802, 14 symbols per subcarrier 804, with a number of the symbols carrying reference signals 806, denoted by solid blocks. In this example, RB 800 refers to a 3GPP™ Release-10 RB, where the reference signals 806 are evenly spread out throughout the RB 800. This figure only illustrates cell specific reference signals. In one example, where a fraction of a RB 808 are to be utilized, for example to further increase power spectral density, the position of the reference signals 806 may be re-arranged, as shown. In this example, RB 808 comprises two thirds of a legacy RB, employing only eight subcarriers 810. Thus, in this example, RB 808 has been reduced in size, however the position and quantity of the reference signals are maintained as being substantially comparable to the 3GPP™ Release-10 RB 800.

In another example embodiment, the RB 808 may be further reduced in size by further reducing the number of subcarriers, for example to further increase power spectral density. In this example, a different reference signal 806 structure may be used to ensure that an appropriate number of reference signals 806 within the fractional RB are transmitted.

Maintaining the reference signal structure from RB 800 in RB 808 has the advantage that channel estimation algorithms developed for RB 800 can be readily modified to the structure of RB 808.

Frequency Hopping

In order to allow for frequency diversity, RBs or sets of resource elements (REs: where a resource element is a single subcarrier occupying a single symbol) that are applied to coverage-limited UEs may be frequency hopped on, say, a symbol-by-symbol basis or on, say, a subframe-by-subframe basis. Frequency hopping would increase frequency diversity and would reduce the impact of inter-cell interference (e.g. adjacent cells serving coverage limited UEs could apply a different hopping pattern and adjacent cells serving normal UEs would not see isolated interference in a restricted set of RBs).

When frequency hopping is applied, a reduced number of physical RBs or sets of REs could be used in the cell (as for other aspects of the invention, as previously described), but the frequency location of those physical RBs or sets of REs may change (from symbol-to-symbol or from subframe-to-subframe, dependent upon the characteristics of the hopping pattern).

When a UE is frequency hopped, there may be some switching delay required between the hopped frequencies (to allow the UE to retune its RF circuits for example). Therefore, in one example embodiment, in order to accommodate this switching delay, a time gap may be inserted between the frequency hops. In this manner, other coverage limited UEs can then be time-multiplexed (or interleaved) into these time gaps.

Figure 9:
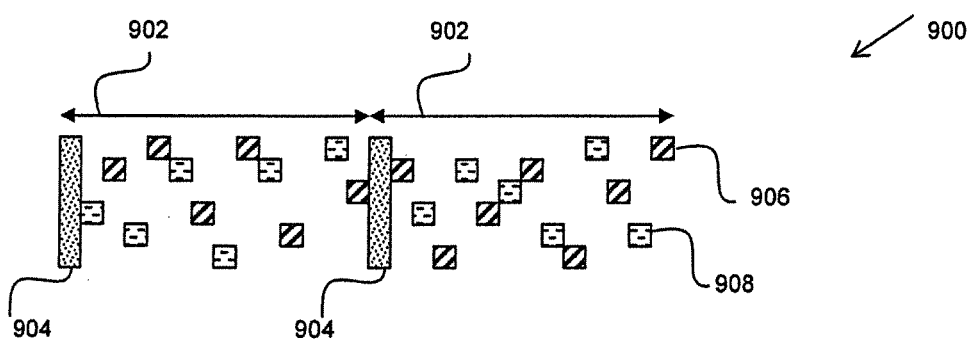
FIG. 9 illustrates a simplified example block diagram of a frequency hopping technique, according to aspects of the invention.

Referring now to FIG. 9, an example simplified schematic drawing 900 of a frequency hopping scheme that allows plural (in this example, two) slow switching UEs to be time-multiplexed into LTE subframes is shown. The schematic drawing 900 illustrates a number of subframes 902, legacy control regions 904, first frequency hopped sets of REs 906 applied to a first UE (UE_A) and second frequency hopped sets of REs 908 applied to a second UE (UE_B). In this example embodiment, for coverage limited UEs, a single resource block (or set of REs) applied by an eNodeB may be frequency hopped. Further, two (or more) UEs may be time multiplexed in the frequency hopping pattern, for example during the time when UE_A is not assigned resources in the hopping pattern, UE_B may be assigned resources. UE_A may use this 'spare' time to retune its RF circuits between different frequencies within the hopping pattern. In this example embodiment, the time to retune RF circuits (e.g. switching time) should be reasonable to enable retuning within a single timeslot. In this example, a time of 0.5 ms is utilised, however other values are envisaged, for example in other example embodiments the switching time may be less than 0.1 ms. In other example embodiments, switching time may be between two and seven symbols, where a symbol lasts for 0.07 ms (1/14). In this example, FIG. 9 would be time multiplexed between 2 and 8 UEs to allow for switching time of the UEs.

Figure 10:
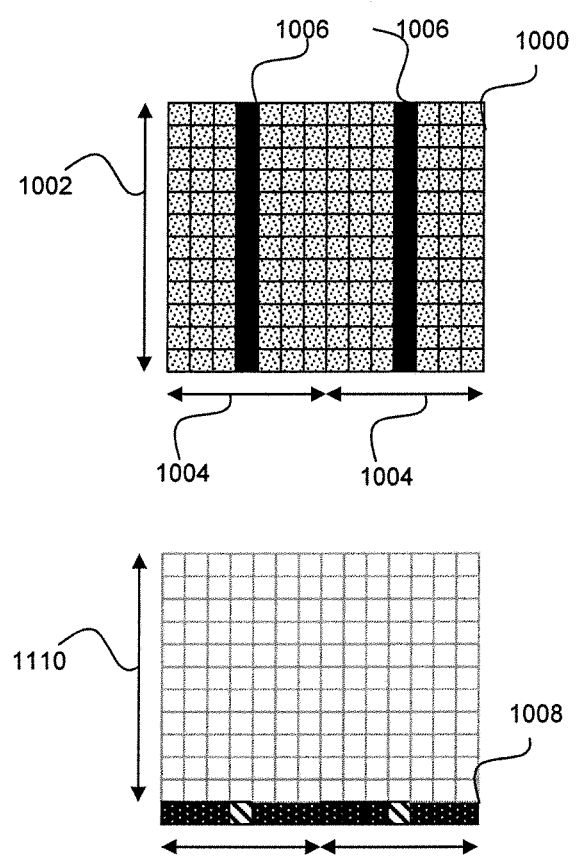
FIG. 10 illustrates a simplified example block diagram of a transmission of uplink signals on a single subcarrier.

Referring now to FIG. 10, a simplified example block diagram of the transmission of uplink signals on a single subcarrier is illustrated, according to aspects of this invention. The simplified example block diagram comprises legacy 3GPP™ Release-10 RB 1000 and coverage limited RB 1008 in accordance with examples of the invention. Legacy 3GPP™ Release-10 RB 1000 further comprises 12 subcarriers 1002, timeslots 1004 and uplink reference signals 1006. In some examples, uplink signals may be power controlled according to the current LTE specifications. At the cell edge, these signals may be sent in a minimum of a single resource block. In order to increase the coverage of these uplink signals, according to this invention, they can be transmitted in less physical resource than a single resource block: down to a single subcarrier. Use of a single subcarrier allows the UE to concentrate its energy into that single subcarrier. In LTE, an uplink physical resource block consists of 12 subcarriers. Hence the potential coverage gain from transmission using a single subcarrier is $10 \times \log_{10}(12) = 10.8$ dB.

When a single subcarrier is transmitted in the uplink coverage limited RB 1008, the other 11 subcarriers of the physical resource block 1110 can be assigned to other UEs. This has an advantage that, in the uplink 1008, there is not necessarily a spectral efficiency loss associated with serving coverage limited UEs. This is in contrast to the case for the downlink, as in the downlink case, the eNodeB assigns all its power to the limited number of subcarriers to improve coverage. Those unused carriers cannot be reused since the eNodeB does not have sufficient power to service those unused subcarriers (note that if the power of the eNodeB were increased, these otherwise unused subcarriers could be brought into operation using the additional power while the coverage limited UEs could still be served with the baseline eNodeB power according to the techniques described hereinbefore). The uplink case is different. If a UE does not have enough power to transmit a lot of subcarriers, a different UE (with its own power source) can transmit on those other subcarriers.

Note that an uplink signal transmitted on a single subcarrier will be able to transmit fewer bits than an uplink signal transmitted on a minimum of a single physical resource block. In order to combat this limitation, a similar approach to that used in the downlink can be applied: the uplink signal can be transmitted across multiple subframes (as described with reference to FIG. 5).

It will be appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system. The program code is operable for, at a network element: transmitting a first portion of subframes comprising a number of resource blocks to a first wireless communication unit in a first mode of operation, wherein the number of resource blocks are transmitted at a first power level per resource block; and transmitting, a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block. The program code is operable for, at a wireless communication unit: receiving in a second extended coverage mode of operation, a signal comprising subcarriers transmitted at a second power level, wherein the signal comprises a second portion of subframes; wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the control processor 296 and control processor 308 have been illustrated and described as a single processing module, whereas in other implementations they may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method for increasing coverage in a wireless communication system, the method comprising, at a network element:
    transmitting a first portion of subframes comprising a number of resource blocks to a first wireless communication unit in a first mode of operation, wherein the number of resource blocks are transmitted at a first power level per resource block;
    transmitting, a second portion of the subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block;
    scheduling a first control channel region in the first portion of subframes and scheduling a second separate additional control channel region in the second portion of subframes.

2. The method of claim 1 wherein the second portion of subframes comprises at least one from a group comprising: almost blank subframes, multimedia broadcast single frequency network (MBSFN) subframes.

3. The method of claim 2 wherein scheduling a second separate additional control channel region in the second portion of subframes unit comprises scheduling at least one of: a physical downlink control channel (PDCCH), a physical hybrid ARQ indicator channel (PHICH), a physical control format indicator channel (PCFICH).

4. The method of claim 3 wherein the channels transmitted by the second additional separate control channel region occupy more than a single subframe.

5. The method of claim 1 further comprising scheduling the second separate additional control channel region in the second portion of subframes is performed across multiple subframes.

6. The method of claim 5 wherein the second separate additional control channel region comprises a control channel signal that allocates a shared downlink resource to the second wireless communication unit.

7. The method of claim 6 wherein at least one of the control channel signal and the shared downlink resource are interleaved over a plurality of second portion of subframes.

8. The method of claim 1 wherein the wireless communication system is a long term evolution communication system.

9. The method of claim 1 wherein the lower number of resource blocks used in the second portion of subframes comprise less than a single physical resource block.

10. The method of claim 1 further comprising scheduling the second portion of subframes in time multiplexed frequency hopped transmissions such that multiple wireless communication units are supported within available downlink resource in a first communication cell.

11. The method of claim 10 wherein scheduling the second portion of subframes such that multiple wireless communication units are time multiplexed within available downlink resource comprises inserting a time gap between frequency hops.

12. The method of claim 11 wherein a resource block in the frequency hopping comprises a first number of symbols and a second number of subcarriers.

13. The method of claim 1 further comprising determining a power requirement of multiple wireless communication units and scheduling a number of resource blocks for the second portion of subframes based at least on the determined power requirement of the second wireless communication unit.

14. The method of claim 13 wherein determining a power requirement of the second wireless communication unit comprises at least one from a group comprising: requesting a path loss measurement from the second wireless communication unit, receiving channel quality information transmitted by the second wireless communication unit, receiving an indication from the second wireless communication unit of the power that it is using for its transmissions.

15. A non-transitory computer program product comprising executable code stored therein for increasing coverage in a wireless communication system, wherein the code is operable for, when executed at a network element, performing the method of claim 1.

16. A network element for increasing coverage in a wireless communication system, the network element comprising a transceiver operably coupled to a control processor, wherein the control processor is arranged to:
- transmit, a first portion of subframes comprising a number of resource blocks to a first wireless communication unit in a first mode of operation, wherein the number of resource blocks are transmitted at a first power level per resource block;
- transmit a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block;
- scheduling a first control channel region in the first portion of subframes and scheduling a second separate additional control channel region in the second portion of subframes.

17. An integrated circuit for a network element for increasing coverage in a wireless communication system, the integrated circuit comprising a control processor, wherein the control processor is arranged to:
- transmit a first portion of subframes comprising a number of resource blocks to a first wireless communication unit in a first mode of operation, wherein the number of resource blocks are transmitted at a first power level per resource block;
- transmit a second portion of subframes to a second wireless communication unit in a second mode of operation at a second power level, wherein the second portion of subframes comprise a lower number of resource blocks than the first portion of subframes and the lower number of resource blocks is transmitted at a second power level per resource block that is higher than the first power level per resource block;
- scheduling a first control channel region in the first portion of subframes and scheduling a second separate additional control channel region in the second portion of subframes.

18. A method for communicating in an increased coverage area in a wireless communication system, the method comprising, at a wireless communication unit:
- receiving in a second extended coverage mode of operation, a signal comprising subcarriers transmitted at a second power level, wherein the signal comprises a second portion of subframes that includes a second control channel region;

wherein the second portion of subframes comprise a lower number of resource blocks than a first portion of subframes that includes a first control channel region that is separate from the second control channel region and that is transmitted at a first power level in a first non-extended coverage mode of operation, and wherein the lower number of resource blocks is transmitted at a second power level per resource block that is higher than the first power level per resource block.

19. A non-transitory computer program product comprising executable code stored therein for communicating in an increased coverage area in a wireless communication system, wherein the code is operable for, when executed at a wireless communication unit, performing the method of claim 18.

20. A wireless communication unit comprising:
- a receiver for receiving in a second extended coverage mode of operation, a signal comprising subcarriers transmitted at a second power level, wherein the signal comprises a second portion of subframes; and
- a control processor, operably coupled to the receiver and arranged to decode the signal wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block, and further wherein the first portion of subframes includes a first control channel region and the second portion of subframes includes a second separate additional control channel region.

21. An integrated circuit for a wireless communication unit comprising:
- a control processor arranged to decode a signal received in a second extended coverage mode of operation, wherein the signal comprises subcarriers transmitted at a second power level and comprises a second portion of subframes, wherein the second portion of subframes comprise a lower number of resource blocks than a first portion of subframes transmitted at a first power level in a first non-extended coverage mode of operation, and wherein the lower number of resource blocks is transmitted at a second power level per resource block that is higher than the first power level per resource block, and further wherein the first portion of subframes includes a first control channel region and the second portion of subframes includes a second separate additional control channel region.

\* \* \* \* \*